Jan. 5, 1971  R. R. MELONE  3,553,666
REMOTE SENSING INDICATOR DEVICE
Filed April 15, 1969  2 Sheets-Sheet 1
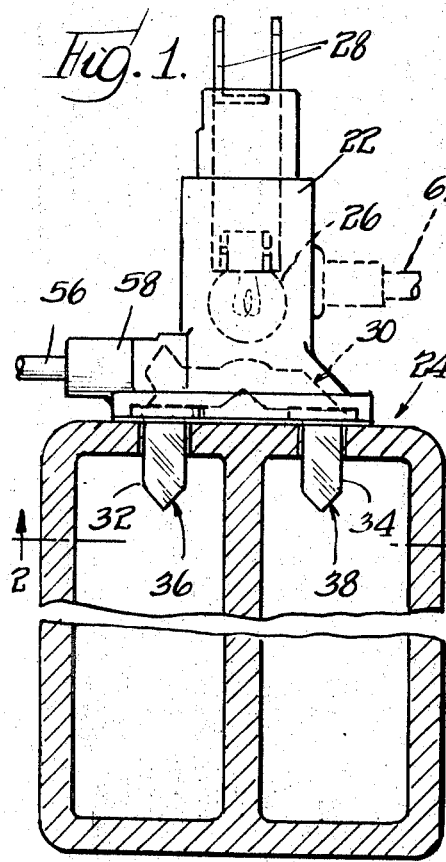
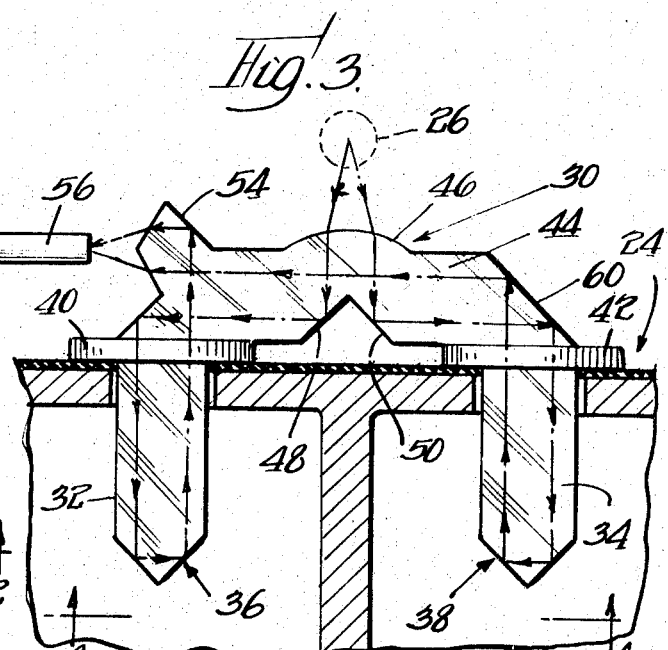
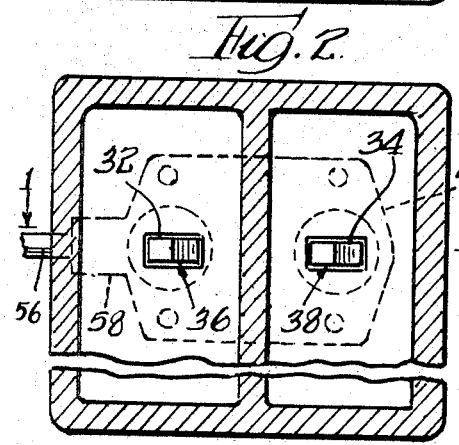
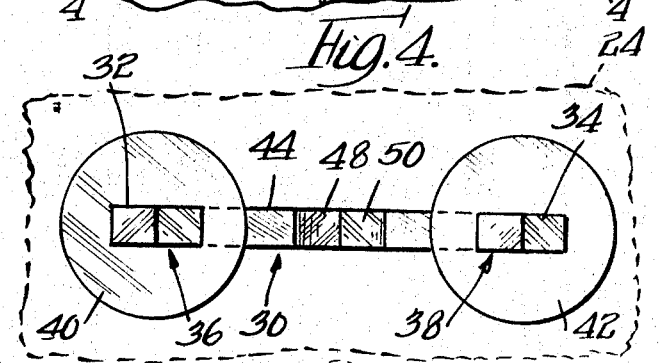
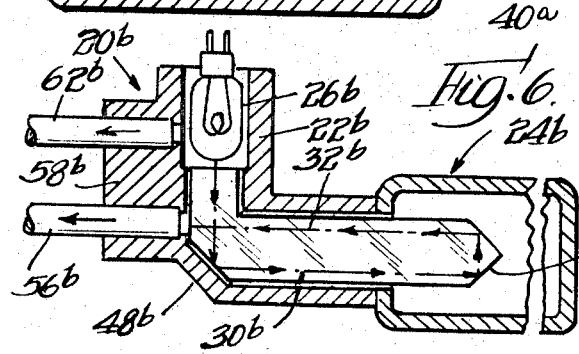
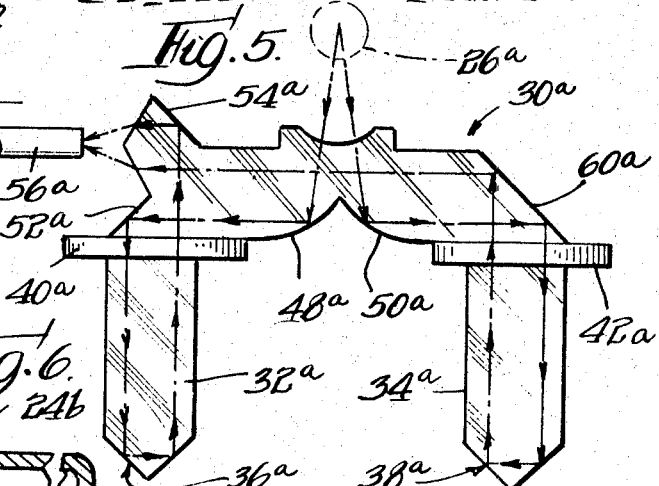
Inventor
Robert R. Melone
By: Olson, Trexler, Wolters & Bushnell
Attys

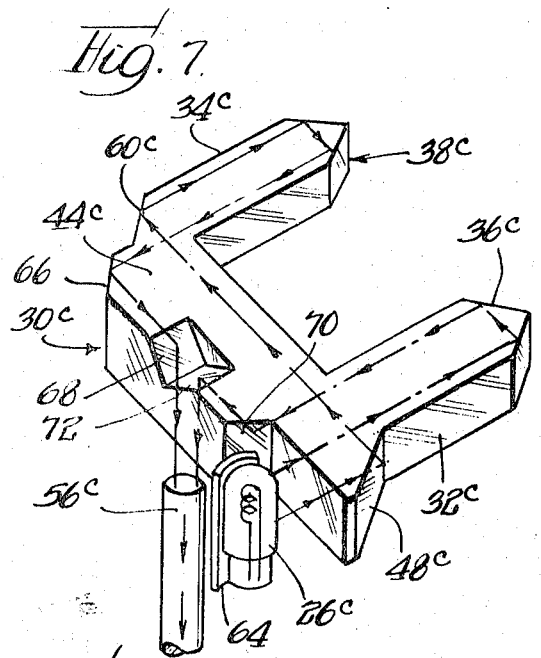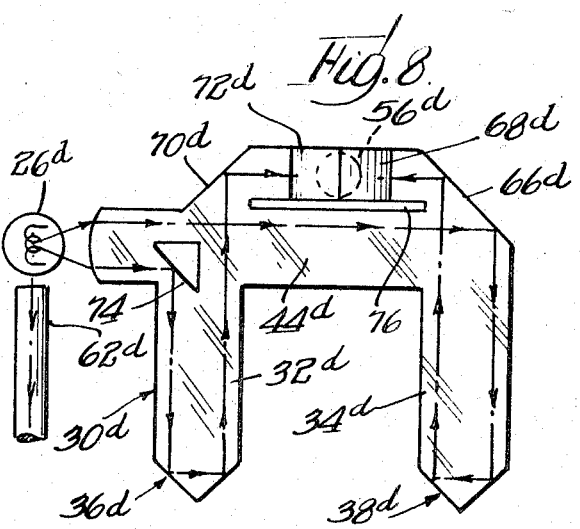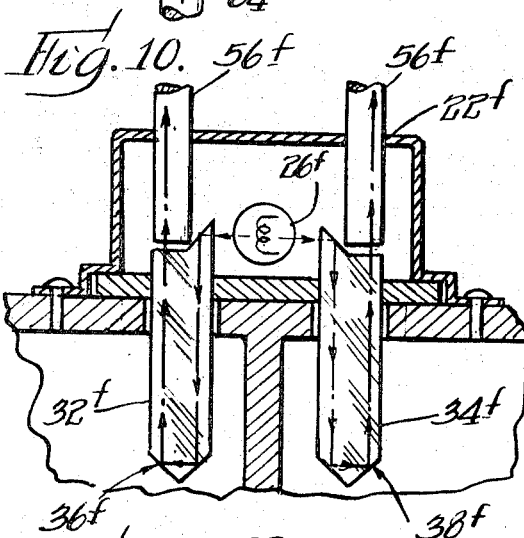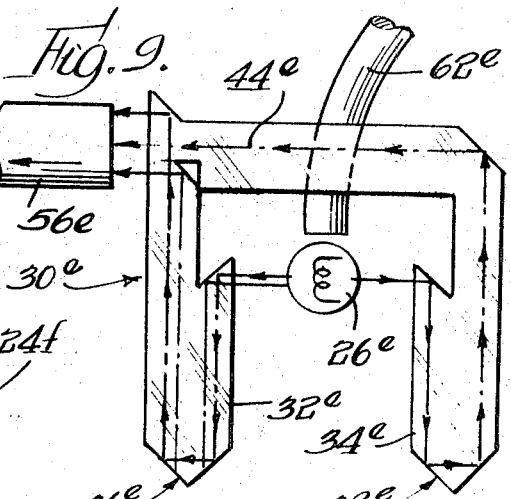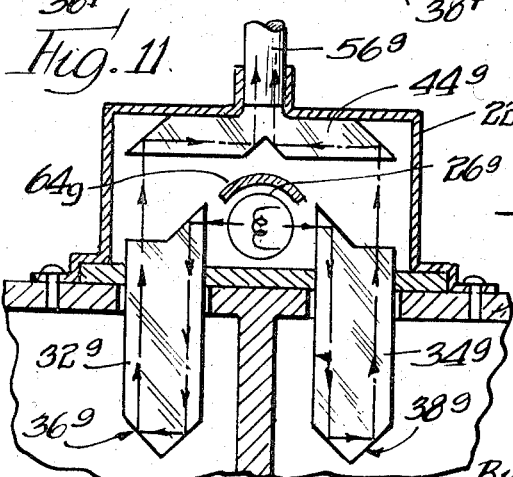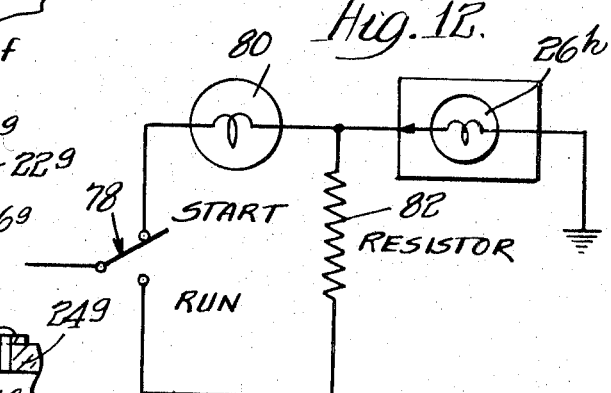

3,553,666
REMOTE SENSING INDICATOR DEVICE
Robert R. Melone, Des Plaines, Ill., assignor to Illinois Tool Works Inc., Chicago, Ill., a corporation of Delaware
Filed Apr. 15, 1969, Ser. No. 816,330
Int. Cl. G08b 21/00
U.S. Cl. 340—244
11 Claims

ABSTRACT OF THE DISCLOSURE

A remote sensing liquid level indicator system in which an indicator member having a plurality of connected indicator arms is inserted in a reservoir and light from a selectively energizable light source is directed through reflective surface means in the member to a prismatic surface means located at the extremity of the member and from the extremity of this member light is thereafter reflected into a light receiving and transmitting means thereby enabling a viewer to ascertain the level of liquid in the reservoir from a remote position.

---

The present invention contemplates the provision of a very simple, yet very practical and efficiently operable means for sensing the level conditions of a liquid within a container and optically indicating such conditions at a point positioned remotely from the container.

More specifically, the present invention contemplates improved, novel means for remotely and optically indicating liquid level conditions within a container by the use of immersible light transmitting material which is adapted to receive light rays from a light source and to reflect such rays when the level of the liquid in an associated container reaches a predetermined low condition.

In addition to optically indicating liquid level conditions at a point remotely located with respect to the container, as above mentioned, the above invention contemplates means for optically and remotely indicating whether or not the light source is functioning.

It is an important object of the present invention to provide an improved device for indicating the level conditions of fluid in conventional brake fluid receptacles, including the contemporaneous indication of liquid level conditions in a plurality of such containers.

The foregoing and other objects and advantages will be more apparent from the following detailed description when considered in connection with the accompanying drawings, wherein:

FIG. 1 is a plan view of an indicator unit of the type contemplated by the present invention, said unit being attached to the side wall of a dual compartment brake fluid reservoir, said reservoirs or receptacles being shown in horizontal section taken substantially along the line 1—1 of FIG. 2;

FIG. 2 is a vertical sectional view taken substantially along the line 2—2 of FIG. 1;

FIG. 3 is an enlarged plan view of the indicator member formed of light-transmitting material, said indicator member being shown in operative association with the side wall of a pair of brake fluid receptacles;

FIG. 4 is an elevational view of the indicator illustrated in FIG. 3, said view being taken substantially along the line 4—4 of FIG. 3, with the container shown in dotted line to expose structures otherwise hidden;

FIG. 5 is a plan view of an indicator member of slightly modified form;

FIG. 6 is a horizontal, sectional view showing a further modified form of indicator member equipped with a single arm adapted for immersion within a liquid container, said indicator member being shown in operative association with a light source, and a pair of fiber bundles, one for indicating the condition of liquid level and the other for indicating the functional condition of the light source;

FIG. 7 is a perspective view of a still further modified form of indicator member, a light source and fiber bundle being disclosed in semidiagrammatic association therewith;

FIG. 8 is a plan view of another embodiment of an indicator member of light transmitting material;

FIG. 9 discloses another modified form of indicator member formed of light transmitting material;

FIG. 10 is a horizontal sectional view disclosing a pair of light transmitting indicator members, each being associated with a receptacle and with a fiber bundle to afford independent, remote, optical indication of the liquid level condition in said receptacles;

FIG. 11 is a horizontal sectional view similar to FIG. 10 disclosing a pair of light transmitting indicator members equipped with prismatic means for reflecting light to a single fiber bundle; and FIG. 12 is a circuit diagram illustrating an alternative electrical remote sensing arrangement for indicating the functional condition of the light source.

Referring now to the drawings more in detail, wherein like numerals have been employed to designate similar parts throughout the various figures, it will be seen that the numeral 20, FIG. 1, indicates generally one form of unit or indicator device contemplated by the present invention which may be attached to the wall of a container. This unit 20 includes a housing or mounting 22 adapted to be attached to the side wall of a liquid container designated generally by the numeral 24. For the purpose of illustrating one practical application of the present invention, the container or receptacle 24 is shown as a conventional brake fluid receptacle of an automobile. Mounted within the housing 22 is a suitable light bulb 26 which may be electrically coupled with a source of supply such as an automobile storage battery (not shown) through the agency of terminals 28. The opposite extremity of the housing 22 accommodates a liquid level indicator member 30 of suitable light transmitting material.

The indicator member 30 includes a pair of arms 32 and 34, the free extremities of which are provided with first prismatic surface means 36 and 38 respectively for receiving and reflecting light rays. The opposite extremities of the arms 32 and 34 are formed integral with flange sections 40 and 42 adapted to bear against the outer surface or wall of the container 24. Bridging the arms 32 and 34 and located beyond the outer surface or wall of the container 24 and encircled by the housing 22 is a section 44. The outer edge of the bridge section 44 is provided with a convex, parabolic surface 46. This parabolic surface 46 permits light rays received from the incandescent lamp or light source 26 to be directed in parallel relation to complementary light reflecting surfaces 48 and 50 as shown in FIG. 3. The surfaces 48 and 50 are adapted to separate light from a single light source into light rays directed in at least two different directions. These surfaces 48 and 50 define an included angle of 90° and are disposed at 45° with respect to vertical plane normal to the arms 32, 34. Thus the light rays received by the surface 48 are directed to a surface 52 which is parallel to the surface 48. Surfaces 48 and 50 combine to direct the light from the source 26 to the first prismatic surface means 36, and as such, may be defined as second prismatic surface means. From the surface 52, the light rays are reflected longitudinally of the arm 32 to the prismatic surface means 36 which comprises a pair of intersecting surfaces disposed at 90° with respect to each other. From the prismatic surface means 36 the light rays are reflected to a surface 54 which operates as a third prismatic surface means, and thence to an extremity of an optical fiber bundle 56 mounted within a supporting sleeve 58, projecting radially of the housing 22 (FIG. 1). The opposite extremity of the fiber bundle 56 may terminate in any desired location, as for example upon the dashboard of an automobile (not shown). By way of explanation, commercially available optical fiber bundles may consist of a plurality of fiber strands including a core of polymethyl methylacrylate or glass sheathed within a transparent coating of low refractive index. A surrounding jacket for the sheathed strands may be made of a suitable polyethylene resin.

It will be apparent that light rays received by the surface 50 from the light source 26 will be directed to a surface 60 and thence to the intersecting surfaces of the prismatic surface means 38, back to the surface 60 and thence longitudinally of the bridge section 44, as illustrated in FIG. 3 the light rays from each arm are thus collected for acceptance by a single light transmitting element. Thus, assuming that the level of the brake fluid in the receptacles of the container 24 is below the level of the arms 32 and 34, light rays from the source 26 will be directed as above described, to the extremity of the fiber bundle 56. If either one or both of the arms 32 and 34 cease to be immersed within the brake fluid, light rays will be directed to the extremity of the fiber bundle 56. The opposite extremity of the fiber bundle 56, positioned for example on the dashboard of an automobile (not shown), will glow when the level of the brake fluid is below either one or both of the arms 32 and 34.

A second fiber bundle 62, shown in dotted lines, may be employed to receive light rays directly from the lamp or light source 26. In this manner the functional condition of the light source may be observed at a location remotely positioned with respect to the unit 20.

In FIG. 5, an indicator member 30a of light transmitting material is shown which is quite similar structurally to the previously described indicator member 30. The only significant structural difference of the indicator member 30a over the member 30 is in the provision of parabolic surfaces 48a and 50a to receive light rays radiating from the light source 26a. By using the parabolic surfaces 48a and 50a, as distinguished from the flat surfaces 48 and 50 of FIG. 3, light rays are properly directed against the light receiving and reflecting surfaces corresponding with the surfaces shown in FIG. 3. Such surfaces and other structures are indicated by numerals corresponding with numerals of FIG. 3, but bearing the suffix a.

FIG. 6 discloses a modified indicator device designated generally by the numeral 20b, having a housing or casing 22b which supports a light source 26b and a level indicator member 30b of light transmitting material. This indicator member 30b includes a single arm 32b as distinguished from the double arm construction previously described. Light rays from the source 26b are directed against a surface 48b disposed at 45° with respect to the direction of travel of light rays from said source. Such light rays are reflected by the surface 48b longitudinally of the arm 32b to a prismatic surface means 36b. Such light rays are then reflected back to the adjacent extremity of a fiber bundle 56b mounted within a housing protuberance 58b. The opposite extremity of the fiber bundle 56b like the previously described member 56 may be mounted or located in a remote position such as on the dashboard of an automobile. A second fiber bundle 62b is so positioned as to convey light rays directly from the lamp 26b to the remote position. In this manner it is possible to ascertain whether the light source or lamp 26b is in functioning condition. Thus when the level of liquid in an associated container 24b is below the arm 32b, light rays from the source 26b will be directed to the fiber bundle 56b. If the portion of the arm 32b projecting within the container 24b is immersed within the liquid, no light rays will be reflected to the fiber bundle 56b.

In FIGS. 7-11 inclusive, various forms of liquid level indicator members are shown. FIG. 7 discloses a level indicator member 30c of light transmitting material having a pair of arms 32c and 34c connected by a bridge section 44c. The free extremities of the arms 32c and 34c are provided respectively with prismatic surface means 36c and 38c corresponding structurally and functionally with the previously described prismatic surface means 36 and 38. The indicator member 30c is adapted to be mounted in association with a liquid container, as for example the brake fluid container 24 previously described. A light source 26c is shielded from a fiber bundle 56c by a suitable shield member 64. Rays from the light source 26c as indicated by directional arrows, are received by an inclined surface 48c and thence directed longitudinally of the bridge section 44c to a surface 60c. The surface 60c reflects the light rays to the prismatic surface means 30c which in turn causes light rays to be reflected to a surface 66. From this surface light rays are directed to a surface 68 and thence to the adjacent extremity of the fiber bundle 56c. Light rays from the source 26c are also directed to the prismatic surface means 36c which reflects such rays back to a surface 70 which in turn reflects the light rays to a surface 72. From this surface the light rays are directed to the adjacent extremity of the fiber bundle 56c; surfaces 68 and 72 thus serve to collect the rays from each arm and direct them for acceptance by a single light transmitting element.

FIG. 8 discloses an indicator device having an indicator member 30d which is similar structurally and identical in function to the previously described indicator member 30c. A portion of the light rays from the source 26d are received and reflected by a surface 74 which acts to separate the light into two directions to a prismatic surface means 36d which returns the light trays to a surface 70d. From this surface, the light rays are reflected to a surface 72d which functions similarly to the previously described surface 72 of FIG. 7. Light rays are also directed from the source 26d longitudinally of the bridge section 44d to a surface 66d and thence to the prismatic surface means 38d. From the prismatic surface means 38d light rays are reflected back to the surface 66d and thence to a surface 68d corresponding with the previously described surface 68 of FIG. 7. The surfaces 68d and 72d direct light rays to the adjacent extremity of a fiber bundle 56d indicated in dotted lines in FIG. 8. A slot 76 is provided to prevent stray light rays from reaching the fiber bundle 56d. It will also be noted that the device shown in FIG. 8 contemplates the use of a second fiber bundle 62d which serves to remotely indicate the functional condition of the light source or lamp 26d.

FIG. 9 discloses a still further modification in the form of a level indicator member designated generally by the numeral 30e. The other parts of the indicator member 30e are assigned numerals which correspond with numerals previously employed, but bear the suffix e. It will be apparent from the directional arrows and from the position of the light source 26e and the light receiving and reflecting surfaces that when the arms 32e and 34e or either of them are positioned so as to be above the level of the liquid in the container with which they may be associated, a fiber bundle 56e will receive light rays from the source 26e and thereby remotely indicate the fact that the level of the liquid or fluid in at least one of the container chambers or receptacles is low and hence requires replenishment. The fiber bundle 62e also serves to remotely indicate the functional condition of the light source 26e.

FIG. 10 discloses a further modification in the form of a pair of indicator arms 32f and 34f. Light rays from a source 26f are received by and reflected from prismatic surface means 36f and 38f. Such rays are received by the adjacent extremities of complementary fiber bundles 56f. A suitable shield 64f serves to prevent stray rays from affecting the readout function of fiber bundles 56f. A suitable housing or casing encompasses the extremities of the fiber bundle 56f and one extremity of the indicator arms 32f and 34f. It will be apparent from the directional arrows shown in FIG. 10 that when the fluid level in the container 24f is below one or both of the arms 32f and 34f, light rays will be received by one or both of the fiber bundles 56f. The arrangement shown in FIG. 10 enables the level of liquid in one of the receptacles in the container 24f to be determined independently of the level of liquid in the other receptacle.

FIG. 11 discloses a modification similar to that disclosed in FIG. 10, with the exception that a single fiber bundle 56g is shown in association with a bridge section 44g which receives light rays from the arms 32g and 34g as indicated by the directional arrows in FIG. 11. It will also be noted that the bridge section 44g is physically separated from the inner extremities of the arms 32g and 34g. As indicated by the directional arrows, light rays from the source 26g will be received and reflected by one or both of prismatic means 36g and 38g, depending upon the level of the liquid in their respective receptacles.

FIG. 12 discloses an electric circuit diagram incorporating a light source 26h which functions similarly to the light sources previously referred to. A switch 78 represents the ignition switch on the dashboard of an automobile. A second lamp 80 is connected in series with the light source 26h and may be remotely positioned with respect to the lamp 26h. When the switch is in start position, as shown in FIG. 12, both of the lamps 26h and 80 are connected in series. If the lamp 80 glows, it is evidence of the fact that the light source 26h is also functioning, when the ignition switch 78 is shifted to the run position, the lamp 80 becomes electrically disconnected and is supplanted by a resistor 82. In other words the provision of the circuit including lamp 80 performs the same function as the previously described fiber bundles 62, 62b, 62d and 62e.

From the foregoing, it will be apparent that the present invention contemplates the provision of a very practical, novel, and highly efficient remote sensing indicator device. While various forms of indicator means or members of light transmitting material are shown in various figures, it will be obvious that all provide a common light source, first, second and third prismatic surface means, means for accommodating elongate light transmitting means in the form of fiber bundles or the like for remotely indicating the level conditions of liquid within a container, together with means in the form of a housing for supporting the parts as a unit, which unit is attachable to a wall of a liquid container. Means in the form of fiber bundles or an electric circuit arrangement may be employed to remotely indicate the functional condition of the light source. In all of the above-described disclosures, a prismatic surface means is provided which is so disposed with respect to a fiber bundle accommodating means or support as to reflect light rays from a second prismatic surface to an area in the vicinity of said fiber bundle support when the level of the liquid in an associated container is below an indicator arm. It will also be noted that the present invention contemplates the provision of a remote sensing indicator means for indicating the functional condition of the light source, said means being either electrical in nature or in the nature of an elongate light transmitting member commonly referred to as a fiber bundle.

The invention is claimed as follows:

1. A remote sensing indicator device for optically indicating liquid level conditions within a plurality of associated receptacles comprising a blade-like indicator means of light transmitting material, said indicator means including a pair of arms, each having at one extremity thereof a first prismatic surface means capable of being immersed within liquid of an associated container, a light source and a discrete light transmitting device operatively associated with second and third prismatic surface means which are at the other extremities of said indicator means, said second prismatic surface means operating to direct light from the source to the first prismatic surface means, said third prismatic surface means operating to direct light from the first prismatic surface means of each arm to the discrete light transmitting device, said first prismatic surface means being so disposed as to reflect light rays received from said second prismatic surface means in such a manner as to indicate a level of liquid by the presence or absence of light transmitted to the discrete light transmitting device, means bridging the other extremities of said arms for operatively associating all three prismatic surface means, said bridging means including means for collecting light from both arms after reflection from the third prismatic surface means for acceptance by a single light transmitting element of said discrete light transmitting device.

2. A remote sensing indicator device in accordance with claim 1, wherein the second prismatic surface means includes a light separator means for directing rays from a single light source in two diverging directions.

3. A remote sensing indicator device as set forth in claim 1, wherein the outer edge of the bridge section is provided with a convex surface for permitting light rays received from the light source to be directed in parallel relation to at least portions of the second prismatic surface means.

4. A remote sensing indicator device as set forth in claim 3, wherein the bridge section is provided with a pair of intersecting surfaces which operate as a light separator means for directing light from the convex surface to each arm.

5. A remote sensing indicator device as set forth in claim 1, wherein the outer edge of the bridge section is provided with a concave surface for permitting light rays received from the light source to be directed to a parabolic light separator means for further reflection to the first prismatic surface means.

6. A remote sensing indicator device as set forth in claim 1, wherein the collecting means includes a pair of surfaces intermediate the arms which surfaces intersect at a line which is parallel to the longitudinal axis of the arms.

7. A remote sensing indicator device as set forth in claim 1, wherein means is provided for remotely indicating the functional condition of the light source.

8. A remote sensing indicator device as set forth in claim 1, wherein electrically operable means is provided for remotely indicating the functional condition of the light source.

9. A remote sensing indicator device as set forth in claim 1, wherein the means for supporting the indicator member and light source in cooperative relation, comprises a housing structure adapted for attachment to the wall of a liquid container.

10. A remote sensing indicator device as set forth in claim 1, wherein the section of the indicator means bridging said arms is formed integral with said arms.

11. A remote sensing indicator device as set forth in claim 1, wherein the section of the indicator means bridging said arms is optically associated with but physically separated from said arms.

(References on following page)

References Cited

UNITED STATES PATENTS

| | | | |
|---|---|---|---|
| 2,256,595 | 9/1941 | Metcalf | 250—227 |
| 3,054,291 | 9/1962 | Landwer | 73—293 |
| 3,120,125 | 2/1964 | Vasel | 73—293 |
| 3,131,670 | 5/1964 | Hardesty | 350—96X |
| 3,141,094 | 7/1964 | Strickler | 250—227X |
| 3,384,885 | 5/1968 | Forbush | 340—244 |
| 3,442,127 | 5/1969 | Nichols | 73—327 |
| 3,449,036 | 6/1969 | Jacobsen | 350—96 |

FOREIGN PATENTS

| | | | |
|---|---|---|---|
| 626,576 | 7/1949 | Great Britain | 73—327 |

S. CLEMENT SWISHER, Primary Examiner

D. M. YASICH, Assistant Examiner

U.S. Cl. X.R.

73—293; 340—59, 380